Jan. 27, 1953 T. C. WHISLER 2,626,471
CABLE OPERATED DRAG SCRAPER
Filed July 21, 1947 4 Sheets-Sheet 3
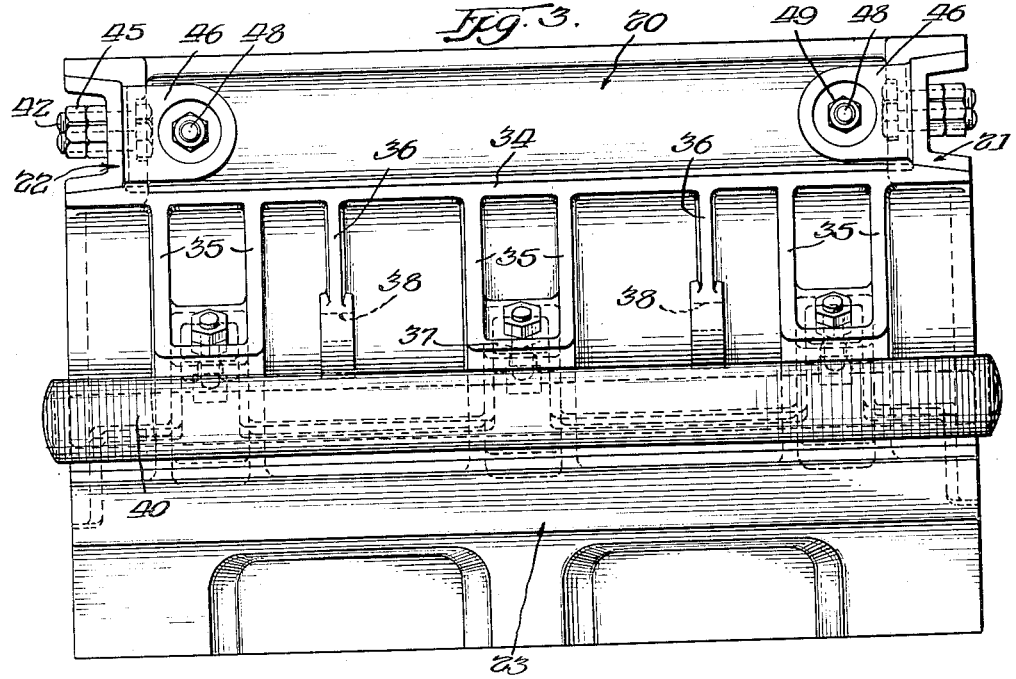
Fig. 3.
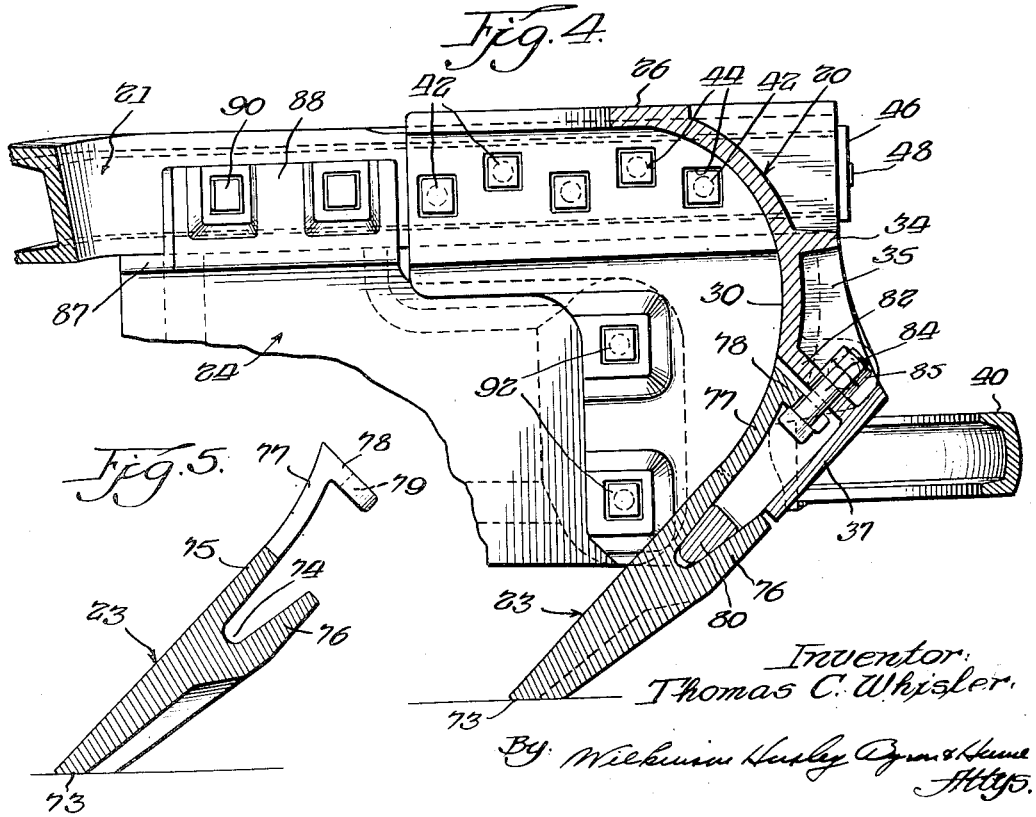
Fig. 4.
Fig. 5.
Inventor:
Thomas C. Whisler.
By Wilkinson Huxley Byron & Hume
Attys.

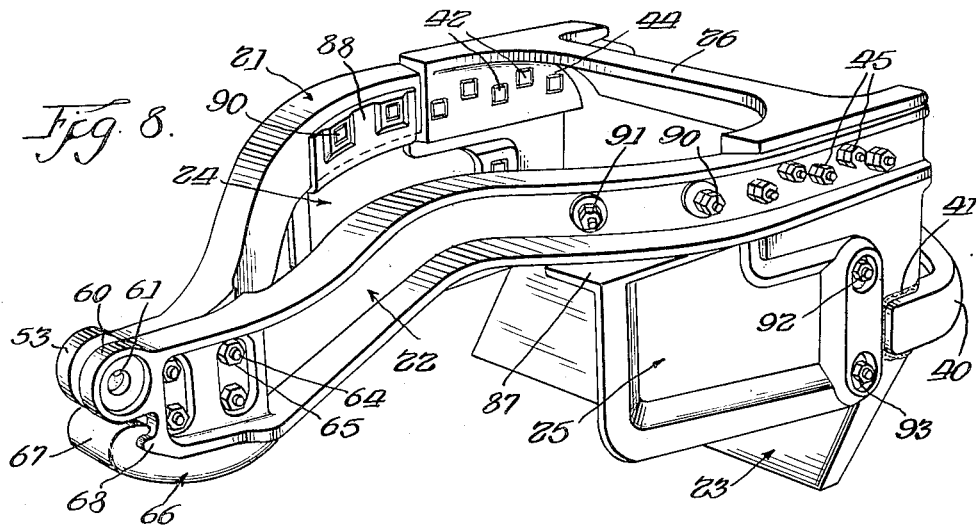
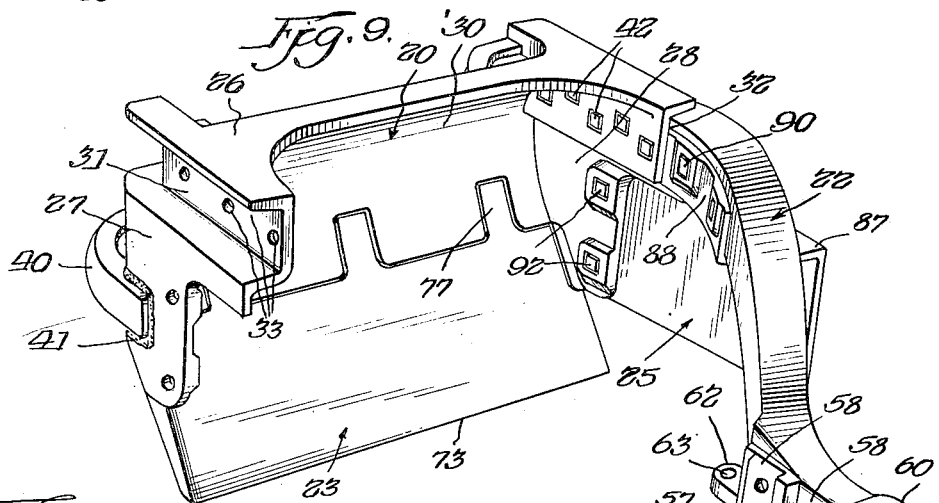

Patented Jan. 27, 1953

2,626,471

UNITED STATES PATENT OFFICE 2,626,471

CABLE OPERATED DRAG SCRAPER

Thomas C. Whisler, Alameda, Calif., assignor to American Brake Shoe Company, New York, N. Y., a corporation of Delaware Application July 21, 1947, Serial No. 762,305

3 Claims. (Cl. 37—147)

The invention relates to scraper buckets and has reference more particularly to a scraper bucket of improved design which will be rugged and durable in construction although consisting of relatively few parts that can be economically manufactured.

An object of the invention resides in the provision of a scraper bucket having a one-piece body member of substantially semi-circular shape in plan with recesses formed integral therewith for receiving a pair of arms which have interfitting relation with the scraper body in a manner to relieve the securing bolts of excessive stresses and strains.

Another object of the invention is to provide a scraper bucket having a pair of arms rigidly secured to the body member in a manner as described and wherein the arms extend forwardly for contact with each other, the contacting portions being keyed by a shoe to prevent release of the arms.

A further object of the invention is to provide a scraper bucket essentially comprising a one-piece body member having a scraping blade or lip portion releasably secured thereto by fastening bolts having connection with the rear surface of the body member and wherein the fastening bolts and the nuts secured thereto are partially housed by special structure formed integral with the body member on the rear thereof so that the bolts are protected against damage during backward travel of the scraper.

A further object resides in the provision of a scraper bucket having a taper fit between the body member and blade portion whereby the weight of the scaper acts to tighten the fit between the parts. As regards this structural feature of the present bucket it may be pointed out that the fastening bolts for securing the blade portion to the body member are disposed substantially parallel to the center line of the taper fit between the parts so that upon tightening the bolts the effect is applied directly to tighten the taper fit.

A further object of the invention resides in the provision of a scraper wherein the overall height is reduced by the manner of securing the arms thereto and which has the effect of lowering the center of gravity of the assembled scraper. Since the arms are attached to the outside surfaces of the body member, being located within channel-shaped recesses provided therefor, said arms are spaced a maximum distance apart which permits a full load of ore or other material to be piled up between the arms and allows the scraper to nestle over large boulders and the like.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 3 is a rear view illustrating certain improved structural features incorporated on the rear of the body member;

Figure 4 is a fragmentary sectional view of the scraper bucket taken substantially along line 4—4 of Figure 1;

Figure 5 is a sectional view taken transversely of the blade or lip portion of the bucket showing structural details thereof;

Figure 6 is a fragmentary sectional view taken substantially along line 6—6 of Figure 2;

Figure 7 is a fragmentary sectional view showing details incorporated in the construction of the body member;

Figure 8 is a perspective view of the completed scraper bucket of the invention;

Figure 9 is a perspective view showing the bucket with one arm and one side wall member removed;

Figure 10 is a perspective view of one of the arms; and

Figure 11 is a perspective view of the shoe having locking relation with the forward contacting end of the arms.

Figure 1:
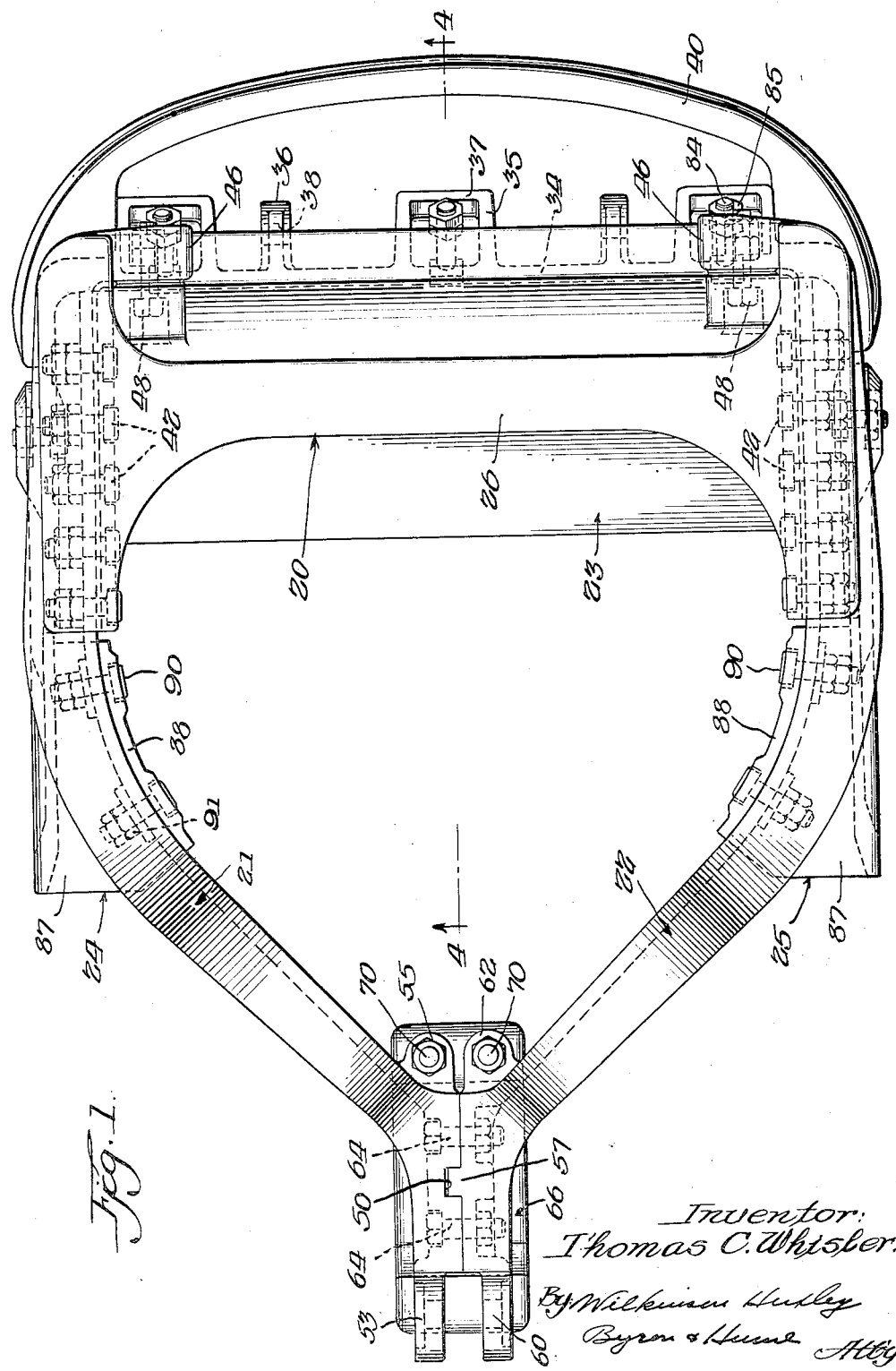
Figure 1 is a top plan view illustrating a scraper bucket constructed in accordance with the invention.

The scraper bucket selected for illustrating the present invention is disclosed in the drawings as including a body member 20 of one-piece construction substantially semi-circular in plan, having a pair of arms 21 and 22 and a scraper blade or lip portion 23 releasably secured thereto. The side wall members 24 and 25 have interfitting relation with the arms and the body member, being releasably secured to both of these parts.

As best shown in Figures 1, 4 and 9, the body member includes a top wall 26, a pair of side walls 27 and 28 and a back wall 30 of curved formation. In accordance with the invention the side walls 27 and 28 of the body member are provided with recesses of channel shape formed integrally with the body member. Recess 31 receives the arm 21, whereas recess 32 receives the arm 22. It will be seen that each recess extends to the rear of the body member, since the arms are bent for engaging with the rear wall of said member, and each recess has a top and a bottom surface which taper outwardly so that the base of the channel is of less height than the opening. A plurality of bolt openings 33 are formed in each side wall of the body member in alignment with the channel-shaped recess for receiving securing bolts by means of which the arms secured to the body member as will be hereinafter described.

Whereas the curved back wall 30 of the body member is smooth and unobstructed throughout its inside surface, the rear surface of said back wall is provided with a horizontal reinforcing rib 34 and a plurality of vertical ribs 35 and 36 connecting with horizontal rib 34. The ribs 35 are spaced to form pairs which are joined by the wall portion 37 providing a substantially tubular formation on the rear of the body member for receiving and protecting securing bolts for the scraping blade 23 as will be presently described in detail. The vertical ribs 36 are apertured at 38 for receiving cables or the like whereby to effect rearward travel of the scraper bucket. If found desirable the rear of the bucket may be protected by means of the bumper or rear guard 40 substantially semi-circular in plan, as shown in Figure 1, and which is suitably welded as at 41 to the side walls 27 and 28 of the body member.

The arms adapted to have releasable securement to the body member by means of the channel-shaped recesses 31 and 32 provided therefor are probably best illustrated in the perspective views, Figures 8, 9 and 10. Each arm is channel-shaped in cross section and the top and bottom surfaces thereof taper so as to fit the tapering formation of the channel-shaped recesses whereby the maximum rigidity is obtained between the parts when the arms are bolted to the body member. For this purpose the bolts 42 are provided which extend through openings 33 in the body member and through openings 43 in the respective arms. The heads of the bolts are square and the inside surfaces of the body member are provided with square socket openings 44 for receiving said square heads. The securing nuts 45 are threaded to the projecting end of the bolts, having location within the channels of the arms, and by tightening said nuts the parts are securely united as described. It will be observed that each arm is provided with an integral lug 46 having a right angle relation with its adjacent portion of the arm and which lug is adapted to extend around the rear of the body member, as shown in Figure 6, whereby such interfitting relation of the arms with the body member acts to relieve the securing bolts of excessive stresses and strains. The lug 46 of each arm is provided with an opening 47 adapted to receive a securing bolt such as 48 which passes through the rear wall of the body member and through said lug for additionally securing each arm to the body member.

At their forward ends the arms have a special formation by means of which they have interlocking relation for rigidly securing the arms together. It will be seen by reference to Figure 10 that arm 21 is provided with a groove 50 located centrally with respect to the flat surface portions 51 provided with bolt receiving openings 52. At the terminal end of arm 21 the same is provided with the ear 53 having opening 54 and rearwardly of this formation an integral boss 55 is formed having an opening 56. The forward end of arm 22 has a complementary formation in that said end is provided with the vertically extending rib 57 located centrally of the flat surface portions 58 having bolt receiving openings 59. When the arms are in assembled relation it will be seen that the rib 57 interfits with groove 50 which brings the flat surface portions 51 and 58 into contacting relation. The ear 60 on arm 22 having opening 61 is located in alignment with ear 53 on arm 21. Also the rearwardly extending boss 62 having opening 63 is located adjacent but in spaced relation with the boss 55 provided by arm 21. The forward contacting ends of the arms are bolted in assembled relation by means of bolts 64 which have secured thereto nuts 65, it being understood that the bolts extend through bolt receiving openings 52 and 59 provided therefor in the respective arms. The invention further contemplates the locking of said forward ends of the arms by means of a shoe 66 to prevent any possibility of the arms slipping with respect to each other. The shoe is provided with an overhanging portion 67 interfitting with the ledge 68 formed integral with each arm and located at the forward end thereof directly below the ears 53 and 60. The shoe is releasably held to the arms by means of a pair of bolts 70, Figure 2, which extend upwardly, passing through openings 71 formed in the shoe and through openings 56 and 63 in the ears 55 and 62, respectively. The upper extending ends of the bolts 70 receive the securing nuts 72.

The blade portion 23 of the scraper bucket is substantially rectangular in shape as clearly evident by reference to Figure 9. The bottom surface 73 is bevelled to form a scraping edge and the top edge of the blade portion is formed with a tapering recess 74 providing the bifurcated wall sections 75 and 76. The front wall section 75 has formed integral therewith a plurality of extensions 77, three being shown in the illustrated embodiment, and each extension includes the depending end 78 having a right angle relation with its extension. Each depending end is slotted at 79. The rear wall 30 of the body member has a bottom edge 80, as best shown in Figure 7, which tapers in a direction downwardly for interfitting relation with the recess 74. At spaced locations along its bottom edge 80 the rear wall 30 is slotted to form the openings 81, three of these slotted openings being provided, and it will be observed that the same are located so as to align with the extensions 77 when the blade portion is properly associated with the body member. The slots 81 have a top terminal edge formed by the wall 82 which wall joins the curved wall 30 with wall portion 37. Said wall 82 may be considered as the bottom of its respective tubular formation located on the rear of the back wall as previously described and which comprises a pair of ribs 35 and the wall portion 37.

Upon assembling the blade portion 23 with the back wall 30 of the scraper the bottom edge 80 will have location in the tapering recess 74 and the extensions 77 will align with the slots 81. As a result of this interfitting relation of the parts the depending end 78 of each extension is located adjacent and substantially parallel to its respective wall 82. Also the slot 79 in each depending end 78 is aligned with a bolt receiving opening 83 in wall 82 and for securing the blade portion to the body member each slot 79 retains the head of a bolt 84, Figure 4, which extends through its aligned opening 83 to project into the tubular formation provided therefor. The bolts receive the threaded nuts 85 for securing the same in place.

An important feature of the invention resides in the location of the securing bolts 84 substantially on the center line of the taper fit between the blade portion and the body member. As a result the action of tightening the bolts 84 is applied directly to the blade portion and in a manner to tighten the taper fit in direct proportion to the tightening action of the bolts. The structure has been designed for ready accessibility to the tightening nuts 85 although the same are protected from damage by means of the surrounding tubular formation. Removability of the blade portion is materially facilitated by said structure since the blade portion can be removed and another one applied to the body member merely by manipulation of the nuts 85 on the securing bolts 84. With the blade portion securely bolted in assembled relation to the body member it will be seen that the extensions 77 have a slight curvature which forms a continuation of the curved inner surface of the rear wall 30.

Figure 2:
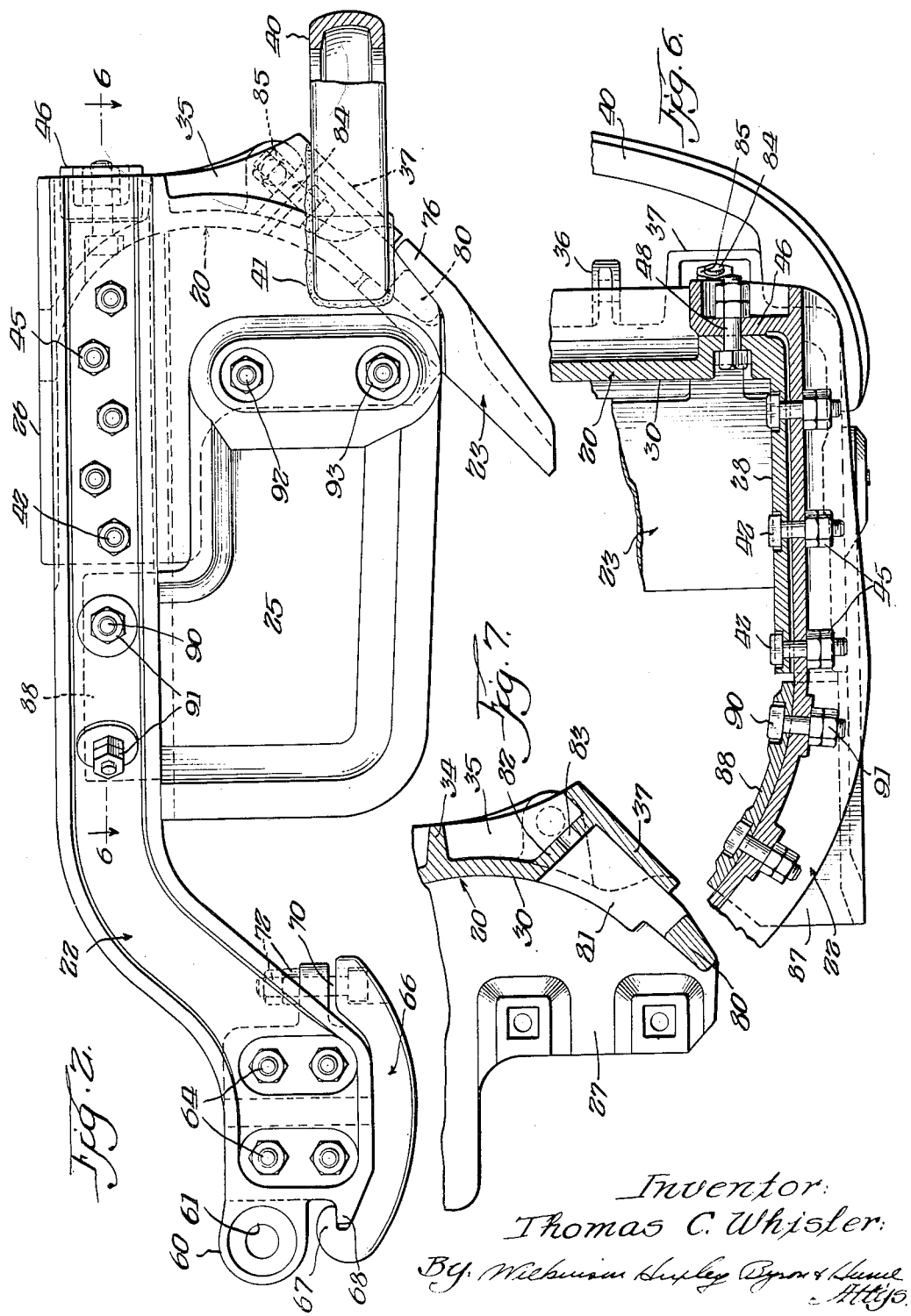
Figure 2 is a side elevational view of the bucket shown in Figure 1.

Each side wall member 24 and 25 has releasable securement to the body member and to its respective arm. For this purpose each member has a special formation which may be described as a double bend. For example, referring to side wall member 25, as shown in Figures 2, 8 and 9, it will be observed that the member has an intermediate horizontal portion 87 located in contact with the underside of the arm 22 and said portion is extended on the inside of the arm providing the interior flange 88. Said flange 88 and the horizontal portion 87 of the side member 25 therefore have contact with the inside wall and the bottom wall of its arm 22. The flange 88 is directly secured to the arm 22 by bolts 90 which receive the threaded nuts 91. The heads of said bolts 90 are square, similar in all respects to bolt 42, and the flange 88 is formed with bosses having square openings for receiving the heads. The side wall member 25 is additionally secured to the body member by means of bolts 92 which extend through from the inside and receive the securing nuts 93. Here also the bolts 92 have square heads which are received by square openings located in bosses formed on the inside wall of the body member.

The formation of the side wall member 24 is exactly similar to that of member 25, the same having an intermediate horizontal portion 87 and an inside flange 88. Bolts 90 are provided for securing the flange to arm 21 and bolts 92 are also employed for securing the side wall member to the body member exactly as described with respect to side wall 25.

The scraper bucket of the application is unique in that the channel-shaped recesses for the arms are formed integral with the body member and are further constructed and arranged to provide a taper fit between the parts. When the arms are secured to the body member by the securing screws the said arms are pulled into the channel-shaped recesses which by reason of the tapering surface assures a rigid connection between these parts and the scraper. Another important feature resides in the rear extension formed on each arm and which has a right angle relation therewith for engaging the back wall of the body member to thereby relieve the securing bolts for the arms of shearing stresses and strains which would otherwise be applied thereto. At their forward ends the arms have contacting relation and are locked by the shoe having a keying fit with the arms. The openings in the aligned ears 60 and 53 provide a hitch to which a cable or the like may be secured for pulling the scraper. The manner of attaching the arms to the body portion has the advantage of reducing the over-all height of the scraper, thereby lowering the center of gravity of the assembled scraper. The space provided between the arms is a maximum for the particular body member which permits a large amount of ore and the like to build up between the arms.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. In a scraper bucket, in combination, a body member of one-piece construction including spaced side walls and a connecting back wall, said body member being generally semi-circular in a horizontal plane, said side walls being vertically disposed and said back wall being curved in a vertical plane, an arm channel-shaped in cross section releasably secured to each side wall, said body member having recesses of channel shape formed integral therewith in the side walls respectively for receiving the arms, each arm having a rear extension at right angles to the arm for engaging the back wall of the body member whereby to securely join the arms to the body member, said arms extending forwardly of the body member and each including a forward contacting portion, the forward contacting portion of said arms having engagement with each other, a shoe in keying relation with the forward contacting portions for locking the arms together, and a blade portion releasably secured to the bottom edge of the back wall of the body member.

2. In a scraper bucket, in combination, a body member of one-piece construction including spaced side walls and a connecting back wall, said body member being generally semi-circular in a horizontal plane, said side walls being disposed vertically and said back wall being curved in a vertical plane, an arm channel-shaped in cross section releasably secured to each side wall, said body member having recesses of channel shape formed integral therewith in the side walls respectively for receiving the arms, each arm having a rear extension at right angles to the arm for engaging the back wall of the body member whereby to securely join the arms to the body member, a side wall member releasably secured to each side wall of the body member and to the arm on its respective side, said arms extending forwardly of the body member and each including a forward contacting portion, the forward contacting portions of said arms having engagement with each other, a shoe in keying relation with the forward contacting portions for locking the arms together, and a blade portion releasably secured to the bottom edge of the back wall of the body member.

3. In a scraper bucket, in combination, a body member of one-piece construction including spaced side walls and a connecting back wall, said body member being generally semi-circular in a horizontal plane, said side walls being vertically disposed and said back wall being curved in a vertical plane, a forwardly extending arm channel-shaped in cross section secured to each side wall, said body member having recesses of channel shape formed integral therewith in the side walls respectively for receiving the arms, said recesses each having a top and bottom surface tapering in an outward direction and each arm having complementary surfaces to provide a taper fit with said recesses, securing bolts passing through each arm and its respective side wall for releasably securing the arm in assembled relation to its side wall, a rear extension formed on each arm and disposed at right angles thereto for engaging the back wall of the body member to substantially eliminate shearing stresses on the securing bolts, said arms each having a contacting portion at its forward end, means in associated relation with the forward contacting portions for locking the arms together, and a blade portion releasably secured to the bottom edge of the back wall of the body member.

THOMAS C. WHISLER.

REFERENCES CITED

The following references are of record in the file of this patent:

UNITED STATES PATENTS

| Number | Name | Date |
|---|---|---|
| 1,095,574 | Heylman | May 5, 1914 |
| 1,397,751 | Allington | Nov. 22, 1921 |
| 1,417,183 | Lawton | May 23, 1922 |
| 2,109,195 | Green | Feb. 22, 1938 |
| 2,385,395 | Baer | Sept. 25, 1945 |
| 2,390,611 | Nixon | Dec. 11, 1945 |
| 2,393,706 | Page | Jan. 29, 1946 |
| 2,482,320 | Clemmer | Sept. 20, 1949 |